(12) United States Patent
Bennett et al.

(10) Patent No.: US 8,848,285 B2
(45) Date of Patent: Sep. 30, 2014

(54) FEW MODE OPTICAL FIBERS FOR ER DOPED AMPLIFIERS, AND AMPLIFIERS USING SUCH

(71) Applicants: Kevin Wallace Bennett, Hammondsport, NY (US); Ming-Jun Li, Horseheads, NY (US)

(72) Inventors: Kevin Wallace Bennett, Hammondsport, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/733,957

(22) Filed: Jan. 4, 2013

(65) Prior Publication Data
US 2013/0182314 A1     Jul. 18, 2013

Related U.S. Application Data

(60) Provisional application No. 61/585,896, filed on Jan. 12, 2012.

(51) Int. Cl.
*H01S 3/067*  (2006.01)

(52) U.S. Cl.
USPC ............................................. 359/341.5; 372/6

(58) Field of Classification Search
USPC ............................................. 359/341.5; 372/6
See application file for complete search history.

(56) References Cited

U.S. PATENT DOCUMENTS

| | | |
|---|---|---|
| 4,474,830 A | 10/1984 | Taylor |
| 4,851,165 A | 7/1989 | Rennell, Jr. et al. |
| 4,962,992 A | 10/1990 | Chapin |
| 5,104,433 A | 4/1992 | Chapin et al. |
| 5,187,759 A | 2/1993 | DiGiovanni et al. |
| 6,326,416 B1 | 12/2001 | Chien et al. |
| 6,467,313 B1 | 10/2002 | Chu et al. |
| 6,531,522 B1 | 3/2003 | Winningham et al. |
| 6,539,152 B1 | 3/2003 | Fewkes et al. |
| 6,563,996 B1 | 5/2003 | Winningham |

(Continued)

FOREIGN PATENT DOCUMENTS

| | | |
|---|---|---|
| EP | 1858128 | 11/2007 |
| JP | 2003 008114 | 1/2003 |

(Continued)

OTHER PUBLICATIONS

Bai, N. et al., "Multimode fiber amplifier with tunable modal gain using a reconfigurable multimode pump," Optics Express, vol. 19, No. 17, pp. 16601-16611, Aug. 2011.

(Continued)

*Primary Examiner* — Mark Hellner
(74) *Attorney, Agent, or Firm* — Svetlana Short

(57) ABSTRACT

According to some embodiments the optical fiber comprises: (i) a glass core doped with greater than 300 ppm of $Er_2O_3$ and at least 0.5 wt % of $Al_2O_3$, with a radius $R_1$ from about 3 μm to about 15 μm, a relative refractive index delta $\Delta_1$ from about between 0.3% to 2% relative to the glass cladding; an effective area of LP01 mode between 20 μm² and 250 μm² at 1550 nm, the glass core radius $R_1$ and refractive index are selected such that the core is capable of supporting the propagation and transmission of an optical signal with X number of LP modes at a wavelength of 1550 nm, wherein X is an integer greater than 1 and not greater than 20; and (ii) a glass cladding surrounding and in direct contact with the glass core.

20 Claims, 3 Drawing Sheets

(56) References Cited

U.S. PATENT DOCUMENTS

| | | | |
|---|---|---|---|
| 6,869,981 B2 | 3/2005 | Fewkes et al. | |
| 7,010,206 B1 | 3/2006 | Baker et al. | |
| 7,221,842 B2 | 5/2007 | Baker et al. | |
| 7,423,105 B2 | 9/2008 | Winningham | |
| 8,285,101 B2 * | 10/2012 | Gapontsev et al. | 385/127 |
| 2002/0197049 A1 * | 12/2002 | Baniel et al. | 385/142 |
| 2003/0077055 A1 * | 4/2003 | Tumminelli et al. | 385/105 |

FOREIGN PATENT DOCUMENTS

| | | |
|---|---|---|
| JP | 2003 202467 | 7/2003 |
| JP | 2003 318473 | 11/2003 |
| JP | 2004 004772 | 1/2004 |
| JP | 2004 091261 | 3/2004 |

OTHER PUBLICATIONS

Jeunhomme, Single Mode Fiber Optics, 39-44, Marcel Dekker, New York 1990.

Ip, Ezra, "88x3x112-Gb/s WDM Transmission over 50 km of Three-Mode Fiber with Inline Few-Mode fiber Amplifier," European Conference on Optical Communications, 2011, Nov. 18, 2011.

Yung, Y. et al., "First demonstration of multimode amplifier for spatial division multiplexed transmission systems," ECOC PDP Th. 13, K.4, Sep. 2011.

Lenahan, T.A., "Calculation of modes in an optical fiber using a finite element method and Eispack," Bell Syst. Tech. J., vol. 62, No. 1, p. 2663, Feb. 1983.

International Search Report and Written Opinion issued Apr. 8, 2013 in counterpart PCT application No. PCT/US2013/020610.

\* cited by examiner

FEW MODE OPTICAL FIBERS FOR ER DOPED AMPLIFIERS, AND AMPLIFIERS USING SUCH

CROSS-REFERENCE TO RELATED APPLICATIONS

This application claims the benefit of priority under 35 U.S.C. §119 of U.S. Provisional Application Ser. No. 61/585,896 filed on Jan. 12, 2012 the content of which is relied upon and incorporated herein by reference in its entirety.

FIELD

The present specification generally relates to optical fibers and, more specifically, to Er doped, few moded optical fibers used in optical amplifiers.

BACKGROUND

Typical optical transmission systems use single mode (SM) optical fibers for transmission of optical signals, and optical amplifiers that utilize single mode rare earth doped fibers to amplify the transmitted signal. However, the explosive growth in the volume and variety of multi-media telecommunication applications continues to drive speed demands for internet traffic and motivate research in backbone fiber-optic communication links. Modal division multiplexing (MDM) is an attractive approach to increase optical fiber transmission capacity. In MDM, an optical fiber containing a few modes is used where each mode carries an independent information channel. In this way, the information capacity is increase by a factor of N, where N is the number of modes in the fiber. However, in order to achieve MDM over long-haul distances, inline erbium-doped fiber amplifiers (EDFA) are required. Current EDFAs are designed for single mode fiber transmissions. When single mode EDFAs are used for MDM systems, the modes from an input few mode transmission fiber need to be separated first. Then each mode is converted to single mode and is amplified separately by a single mode EDFA. After amplification, the output single mode signals from amplifiers need to be converted back to the modes in an output few mode transmission fiber. This process is complex and not cost effective.

SUMMARY

According to some embodiments the optical fiber comprises:

(i) a glass core doped with greater than 300 ppm of $Er_2O_3$ and at least 0.5 wt % of $Al_2O_3$, with a radius $R_1$ from about 3 μm to about 15 μm, a relative refractive index delta $\Delta_1$ from about between 0.3% to 2% relative to the glass cladding; an effective area of LP01 mode between 20 μm$^2$ and 250 μm$^2$ at 1550 nm, the glass core radius $R_1$ and refractive index are selected such that the core is capable of supporting the propagation and transmission of an optical signal with X number of LP modes at a wavelength of 1550 nm, wherein X is an integer greater than 1 and not greater than 20; and (ii) a glass cladding surrounding and in direct contact with the glass core.

Preferably 1<X<20. According to some embodiment the optical fiber core further includes $GeO_2$.

According to some embodiments an optical fiber comprises a glass core surrounded by a glass cladding. The glass core is doped with greater than 700 ppm of $Er_2O_3$, at least 0.5 wt % $Al_2O_3$ and preferably 5 to 25 wt % of $GeO_2$, has a radius 3 μm≤$R_1$≤15 μm; a maximum relative refractive index delta $\Delta_{1MAX}$ from between 0.7 to 1.5% relative to the glass cladding, and an effective area of LP01 mode between 50 μm$^2$ and 150 μm$^2$. The glass core supports the propagation and transmission of an optical signal with X number of LP modes at a wavelength of 1550 nm, wherein X is an integer greater than 1 and less than 20 (and preferably not larger than 10) at 1550 nm wavelength. The a glass cladding surrounds and is in direct contact with the glass core and has a maximum refractive index $\Delta_{4MAX}$, wherein the glass core comprises a maximum relative refractive index $\Delta_{1MAX}$ such that $\Delta_{1MAX} > \Delta_{4MAX}$.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
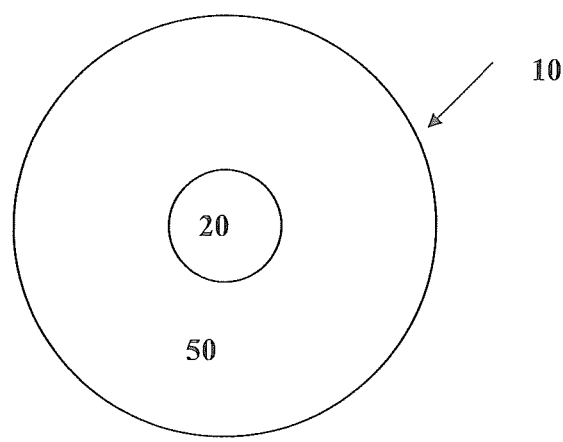
FIG. 1 schematically depicts a cross section of a few moded Er doped optical fiber according an embodiments described herein.

Reference will now be made in detail to embodiments of optical fibers for use as long haul transmission fibers, examples of which are illustrated in the accompanying drawings. Whenever possible, the same reference numerals are used throughout the drawings to refer to the same or like parts.

Terminology

The following terminology will be used herein to describe the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," as used herein, is defined as:

$$\Delta(r) = [n(r)^2 - n_{REF}^2]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" $A_{eff}$ of an optical fiber is the area of the optical fiber in which light is propagated and is defined as:

$$A_{eff} = 2\pi \frac{\left(\int_0^\infty E^2 r dr\right)^2}{\int_0^\infty E^4 r dr},$$

where E is the electric field associated with light propagated in the fiber and r is the radius of the fiber. The effective area is determined at a wavelength of 1550 nm, unless otherwise specified.

Mode field diameter (MFD) is a measure of the spot size or beam width of light propagating in a single mode fiber. Mode-field diameter is a function of the source wavelength, fiber core radius and fiber refractive index profile. MFD is determined using the Peterman II method where $$MFD = 2w, \text{ and}$$

$$w^2 = 2 \frac{\int_0^\infty E^2 r dr}{\int_0^\infty (dE/dr)^2 r dr}$$

where E is the electric field distribution in the fiber and r is the radius of the fiber.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the LP11 mode. A mathematical definition of a theoretical cutoff wavelength is given in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding.

As used herein, the term "few moded fiber" refers to a fiber supporting the propagation of more modes than a single mode fiber but fewer modes than a normal multimode fiber (i.e., not greater than 20 LP modes). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983).

Light traveling in an optical fiber or other dielectric waveguide forms hybrid-type modes, which are usually referred to as LP (linear polarization) modes for simplicity. The LP0p modes have two polarization degrees of freedom and are two-fold degenerate, the LP 1p modes are four-fold degenerate with two spatial and two polarization degrees of freedom, and the LPmp modes with m>1 are also four-fold degenerate. We do not count these degeneracies when we designate the number of LP modes propagating in the fiber. For example, an optical fiber in which only the LP01 mode propagates is a single-mode fiber, even though the LP01 mode has two possible polarizations. A few-moded optical fiber in which the L01 and LP11 modes propagate supports three spatial modes since the LP11 mode is two-fold degenerate, and each mode also has two possible polarizations, giving a total of 6 modes. Thus, when a fiber is said to have two LP modes, it is meant that the fiber supports the propagation of all of the LP01 modes and LP11 modes.

The term "α-profile" or "alpha profile," as used herein, refers to a relative refractive index profile, expressed in terms of Δ which is in units of "%", where r is the radius and which follows the equation, $$\Delta = \Delta_{1max}\left[1 - \left(\frac{r}{R_1}\right)^\alpha\right],$$

where $\Delta_{1MAX}$ is the maximum relative refractive index of the core, $R_1$ is the radius of the core, r is in the range $r_i \leq r \leq r_f$, Δ is as defined above, $r_i$ is the initial point of the α-profile, $r_f$ is the final point of the α-profile, and α is an exponent which is a real number. For a step index profile, the alpha value is greater than or equal to 10. For a graded index profile, the alpha value is less than 10. The term "parabolic," as used herein, includes substantially parabolically shaped refractive index profiles with α=2±0.1 as well as profiles in which the curvature of the core is characterized by α=2±0.1 over the radius range from 0.1*$R_1$ to 0.95*$R_1$.

Unless otherwise specified herein, the above-referenced properties of the optical fiber disclosed herein and discussed below are measured or modeled at 1550 nm.

FIG. 1 is a schematic cross-sectional view of one embodiment of the few mode optical fiber ("fiber") 10 according to the disclosure. The various example embodiments of fiber 10 are now described below with respect to cross-sectional views of the fiber and plots of the corresponding refractive index profiles. FIG. 2 illustrates an exemplary refractive index profile of an example embodiment of fiber 10.

The optical fiber 10 comprises a few moded core 20 and a cladding 50. The cladding may be surrounding by one or more coatings (not shown). That is, the core 20 propagates more than 1 and no more than 10 optical modes. That is, core 20 supports the propagation and transmission of an optical signal with X number of LP modes at a wavelength of 1550 nm, wherein X is an integer greater than 1 and not larger than 20, for example X=19, X=16, X=12, X=10, X=9, X=6, X=4, X=3 or X=2. The disclosed few mode Er-doped fiber is suitable for amplifying signals in a modal division multiplexed transmission system where each mode caries one or more independent signal channels. In principle, the larger the number of modes, the more information capacity will be. But if the number of mode is too large, it is difficult to design modal division multiplexing/demultiplexing components to separate the modes. In addition, mode coupling among the modes becomes a problem. A number of modes between 2 and 20 is an optimum choice. Preferably the number of modes is 2 to 10. The outer radius of the core 20 is $R_1$ and the outer radius of the cladding 50 is $R_4$.

The core 20 is doped with $Er_2O_3$ for light amplification. Applicants discovered that in order to design of a few moded Erbium doped fiber 10 one has several compositional parameters that preferably should be considered. In order to reduce the likelihood of mode coupling, it is advantageous to reduce the length of the fiber 10. A reduced length optical fiber 10 can be achieved by doping the glass with a suitably high level of Erbium, for example 700 ppm or higher. The solubility of Erbium in pure silica or in $GeO_2$-doped silica is low, and if suitably high levels of Erbium are incorporated, the Er ions are not diffused through the glass uniformly, leading to Er—Er interactions and lower pumping efficiency. In order to increase the solubility of Er in core 20, and thus uniformity of Er distribution within the required area of the fiber core, $Al_2O_3$ should be preferably incorporated in the glass as a fluxing agent to obtain a more uniform Er ion distribution. While relatively low levels of 1-3 Wt % of $Al_2O_3$ can serve this purpose, it is preferred to have 1) greater than 7 Wt % $Al_2O_3$ in order to influence the Er-ion environment which leads to a broader gain spectrum and 2) lower than 10 Wt % of $Al_2O$ due to solubility issues with incorporation of higher $Al_2O_3$ levels. In a silica based fiber 10, in order to obtain a few-moded fiber profile with the desired Delta versus radius through incorporation of index modifying dopants there is a preferred hierarchy of compositional allocation. First, it is preferable that the appropriate level of $Er_2O_3$ has it's index contribution allocated, and secondly the targeted level of $Al_2O_3$ should preferably have it's index contribution allocated. Depending upon the targeted profile shape the remaining delta contribution should be filled by a suitable index modifying dopant, for example Ge (if delta needs to be increased), or a down dopant if core delta needs to be decreased. More specifically, for use as a downdopant, Fluorine is the preferred dopant due to Boron creating absorption in the Erbium emission wavelength range. For updopant use of $GeO_2$ is preferred as it has minimal impact on the Er emission spectrum and is readily available in most silica fiber making facilities. Ones skilled in the art of fiber making will recognize that other updopants (P, Ti, Cl, Ga, Zr, Nb, Ta etc.) can be incorporated as well as long as the impact on rare earth emission is factored in to the design. The doping concentration of $Er_2O_3$ is preferably greater than 300 ppm, more preferably greater than 500 ppm, even more preferably greater than 700 ppm and less than 5000 ppm (for example 1000 ppm to 3000 ppm, or 1000 to 1500 ppm). Preferably, $Al_2O_3$ is added to the core 20 and/or to disperse Er uniformly throughout the core in order to minimize potentially harmful interactions between Er ions, and/in order to increase the amplification bandwidth. Preferably the concentration of $Al_2O_3$ is greater than 0.5 wt %, more preferably greater than 2%, and even more preferably between 6 and 10%. The core index profile is shown schematically in FIG. 2A. The shape of the profile can be described by α-profile. The core index profile can be a step profile (α>10) or a graded index profile (α<10). For example, in an embodiment with a graded index core, the alpha value may be greater than or equal to about 1.8 and less than or equal to about 2.2 at a wavelength of 1550 nm. To achieve a desired relative refractive index increase in the core, $GeO_2$ can be added to the core 20. The concentration of $GeO_2$ to the core 20, if $GeO_2$ is utilized is preferably is of 5 to 25 wt %, more preferably between 10 to 25 wt %. The core delta is between 0.3 to 2%, more preferably between 0.4 to 1.5% (e.g., 0.6%, 0.7%, 0.8%, 1%, 1.25%, or therebetween), relatively to the glass cladding. The core radius $R_1$ is in the range of $3\ \mu m \leq R_1 \leq 15\ \mu m$. The core radius $R_1$ is selected according to the core delta to support at least two modes at 1550 nm wavelength. Preferably the cutoff of the LP11 mode is greater than 2000 nm, more preferably greater than 2500 nm The numerical aperture NA of the fiber is greater than 0.15 and less than 0.3, for example between 0.15 and 0.25 or between 0.18 and 0.22, or between 0.15 and 0.2. An effective area of the LP01 mode may be between $20\ \mu m^2$ (e.g., $20\ \mu m^2$, $30\ \mu m^2$, $40\ \mu m^2$ or any number therebetween) for higher core delta and $200\ \mu m^2$ (for the lower core deltas), for example between $20\ \mu m^2$ and $70\ \mu m^2$, or between $25\ \mu m^2$ and $60\ \mu m^2$, or between 25 and $50\ \mu m^2$.

Figure 2A:
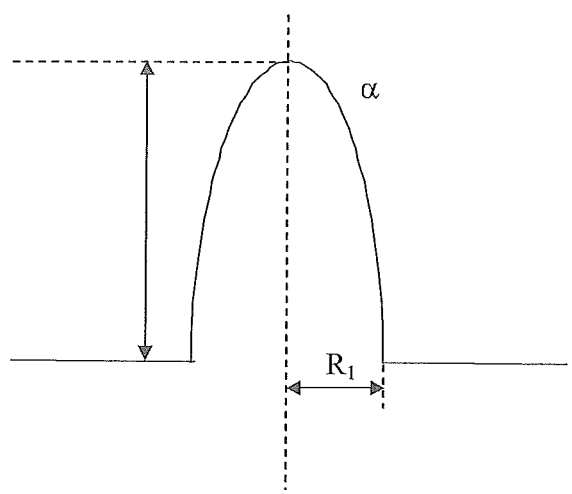
FIG. 2A is an exemplary plot of the relative refractive index profile of the one optical fiber embodiment corresponding to FIG. 1.
Figure 2B:
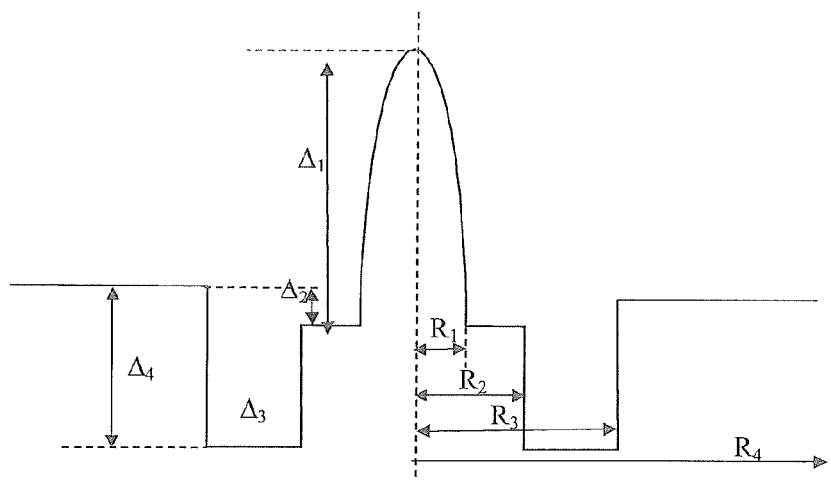
FIG. 2B is an exemplary plot of another relative refractive index profile of another optical fiber embodiment corresponding to FIG. 1.

Another embodiment of core profile design is shown schematically in FIG. 2B. As shown in this figure, in this embodiment the glass cladding includes a low index ring layer 53 and an optional inner cladding layer 52 surrounding and in direct contact with the few-moded glass core 20. The inner cladding layer 52 may have a relative refractive index $\Delta_2$ such that $\Delta_{1MAX} \geq \Delta_2$, where $\Delta_{1MAX}$ is the maximum refractive index delta of the core 20 (relative to the outer cladding) and $\Delta_2$ is the refractive index delta of the inner cladding layer 52. As defined herein, that in the embodiments that have a narrow center line spike, $\Delta_{1MAX}$ is measured outside this spike,—i.e., at a distance of about 0.5 μm from the center line. A low index ring 53 may surround and directly contact the inner cladding layer, or alternatively may surround and directly contact the core 20. Preferably, the low index ring 53 has a minimum relative refractive index delta $\Delta_{ring\ MN}$ of less than −0.2%; for example less than −0.25%, less than −0.3% or $-0.6\% < \Delta_{ring\ MN} < -0.2\%$. The outer cladding layer 54 may surround and directly contact the low index ring. The low index ring 53 has a minimum relative refractive index $\Delta_{3MIN}$ relative to the outer cladding layer and the outer cladding layer 54 has a maximum relative refractive index $\Delta_{4MAX}$ relative to pure silica glass such that $\Delta_{1MAX} > \Delta_{4MAX} > \Delta_{3MIN}$. In this embodiment, a low index ring 53 is placed between the central core 20 and the cladding layer 54. The core is similar to the core design described above in FIG. 2A. As described above, the ring 53 can be adjacent to the central core 20 (not shown) or has a space offset from the central core, as shown in FIG. 2B. The offset $R_2 − R_1$ (the width of the inner cladding layer 52) is between 0 to 15 μm. The relative refractive index deltalta $\Delta_3$ of the ring layer 53 is between −0.15 to 0%. In the embodiment shown in FIG. 2B the low index ring 53 has a starting radius of $R_2$ and an ending radius $R_3$. The low index ring has an index change of $\Delta_{3MIN}$, and a ring width W of $R_3 − R_2$. It can be made of glass doped with a index decreasing dopant such as F, or B. Preferably $\Delta_{3MIN}$ is between −0.1 and −0.7%, more preferably between −0.3 and −0.5%. The ring width W is preferably between 2 to 8 μm, more preferably between 4 to 6 μm. In this embodiment the cross-section of the refractive index profile of the low index ring 53 is rectangular, but the relative refractive index profile of the low index ring can be of other shapes, like triangular or parabolic for additional mode-field control in the fiber design.

Tables 1 and 2 provide parameters for fourteen modeled profile examples of the optical fiber 10. Examples 1-10 have a simple core design as shown in FIG. 2A, Examples 11-14 have a profile with core and a low index ring. Examples 1-7 have a step index core, while Examples 8-14 have a graded index core.

TABLE 1

| Example | 1 | 2 | 3 | 4 | 5 | 6 | 7 |
|---|---|---|---|---|---|---|---|
| $\Delta_1$ (%) | 0.34 | 0.5 | 0.75 | 1 | 1.5 | 2 | 0.3 |
| $Er_2O_3$ (ppm) | 500 | 600 | 700 | 800 | 1000 | 1500 | 800 |
| $Al_2O_3$ (wt %) | 4.1 | 6.0 | 8.4 | 9.0 | 10.4 | 7 | 3.6 |
| $GeO_2$ (wt %) | 0 | 0 | 0.75 | 4.0 | 4.7 | 22 | 0 |
| $R_1$ (um) | 7 | 6.5 | 5.8 | 5 | 4 | 3 | 10.5 |
| α | 200 | 200 | 200 | 200 | 200 | 200 | 20 |
| $\Delta_2$ (%) | 0 | 0 | 0 | 0 | 0 | 0 | 0 |
| $R_2$ (um) | n/a | n/a | n/a | n/a | n/a | n/a | n/a |
| $\Delta_3$ (%) | 0 | 0 | 0 | 0 | 0 | 0 | 0 |
| $R_3$ (um) | n/a | n/a | n/a | n/a | n/a | n/a | n/a |
| $\Delta_4$ (%) | 0 | 0 | 0 | 0 | 0 | 0 | 0 |
| Number of modes | 5 | 7 | 8 | 8 | 8 | 6 | 10 |
| LP11 cutoff (um) | 2.150 | 2.423 | 2.653 | 2.647 | 2.604 | 2.266 | 2.894 |
| MFD (um) | 12.6 | 11.1 | 9.6 | 8.3 | 6.7 | 5.3 | 16.1 |
| Aeff (um²) | 133.6 | 106.7 | 80.7 | 60.0 | 38.7 | 23.6 | 230.1 |

TABLE 2

| Example | 8 | 9 | 10 | 11 | 12 | 13 | 14 |
|---|---|---|---|---|---|---|---|
| $\Delta_1$ (%) | 0.6 | 0.9 | 1.2 | 1.1 | 1.4 | 1.6 | 1.2 |
| $Er_2O_3$ (ppm) | 900 | 2000 | 2500 | 2200 | 1300 | 1600 | 3000 |
| $Al_2O_3$ (wt %) | 7.2 | 7 | 6 | 8 | 9 | 10 | 7 |
| $GeO_2$ (wt %) | 0 | 5.2 | 11.4 | 7.0 | 10.2 | 11.8 | 10.0 |
| $R_1$ (um) | 6.5 | 8.2 | 9.5 | 9.5 | 6 | 10 | 6 |
| α | 10 | 2 | 2 | 2 | 2.5 | 1 | 3 |
| $\Delta_2$ (%) | 0 | 0 | 0 | 0 | 0 | −0.1 | 0 |
| $R_2$ (um) | n/a | n/a | n/a | 10.5 | 8 | 13 | 7.5 |
| $\Delta_3$ (%) | 0 | 0 | 0 | −0.4 | −0.2 | −0.75 | −0.5 |
| $R_3$ (um) | n/a | n/a | n/a | 15.5 | 18 | 16 | 11.5 |
| $\Delta_4$ (%) | 0 | 0 | 0 | 0 | 0 | 0 | 0.1 |
| Number of mode | 7 | 10 | 18 | 17 | 9 | 18 | 9 |
| LP11 cutoff (um) | 2.423 | 2.819 | 3.775 | 3.775 | 2.582 | 3.186 | 2.217 |
| MFD (um) | 10.2 | 9.2 | 9.1 | 9.1 | 7.2 | 7.5 | 7.6 |
| Aeff (um²) | 87.5 | 65.6 | 65.2 | 65.2 | 40.8 | 43.2 | 46.2 |

Figure 3:
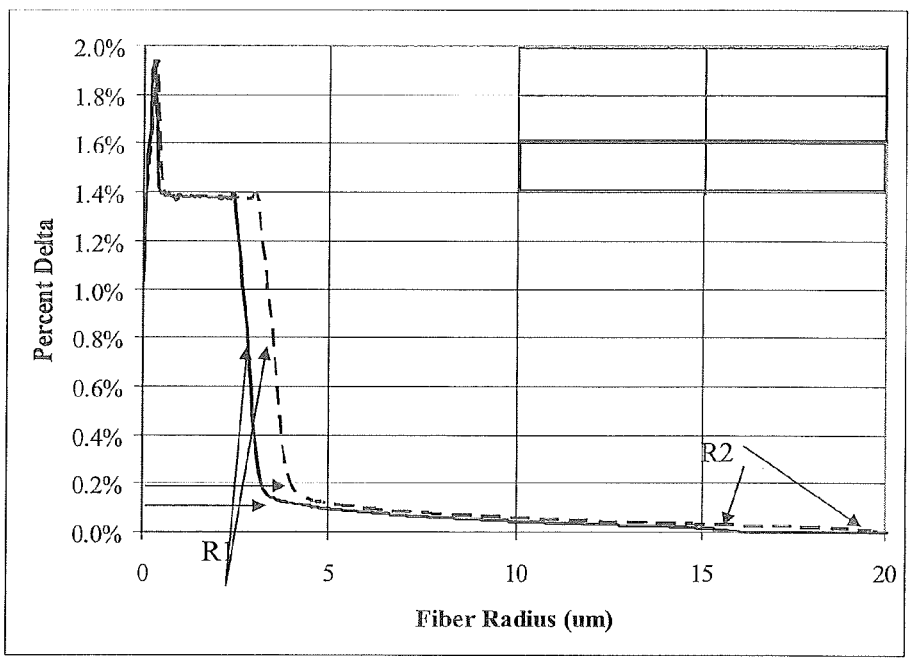
FIG. 3 is a plot of relative refractive index profiles of two manufactured optical fiber embodiments corresponding to FIG. 1.

FIG. 3 shows profiles of two exemplary embodiments of Er-doped few mode fibers that were made using the OVD process. For both fibers, the $Er_2O_3$ doping concentration in the core is about 1300 ppm, the $GeO_2$ doping concentration in the core is about 13%, and the $Al_2O_3$ doping concentration in the core is about 7.9%. The resulted maximum core refractive index delta is about 1.38%. The fiber optical parameters depend on the core radius. For Exemplary Embodiment 1 (see solid curve) of FIG. 3, the core radius is 3.4 μm and for Exemplary Embodiment 2 (dashed curve) of FIG. 3 the core radius is 4.2 μm. Both fiber embodiments shown in FIG. 3 include a few moded core 20 doped with Er and at least 0.5 wt % $Al_2O_3$, and an inner cladding 52 directly adjacent to and surrounding the core. Although in some embodiments the inner cladding has a relatively flat relative refractive index profile (as shown in FIG. 2B), FIG. 3 illustrates that the relative refractive index of the inner cladding region 52 may also be decreasing with an increased radius. In these two embodiments the outer radius R2 of region 52 is about 20 μm. The embodiments of FIG. 3 do not utilize a low index ting, but utilize an outer cladding 54 (not shown) which extends from the radius of 20 μm to 62.5 μm. As described above, as defined herein, in the fiber embodiments that have a narrow center line spike (as shown in FIG. 3), $\Delta_{1MAX}$ is measured outside this spike,—i.e., at a distance of about 0.5 μm from the center line. Thus, for the two embodiments in FIG. 3 $\Delta_{1MAX}$ is 1.4%. The calculated optical properties based measured refractive index profiles in the performs are summarized in the following Table 3.

TABLE 3

|  | Exemplary Embodiment 1 | Exemplary Embodiment 2 |
|---|---|---|
| LP11 cutoff (nm) | 2287 | 2534 |
| LP01 mode field diameter (um) | 6.04 | 6.36 |
| LP01 mode effective area (um²) | 29.5 | 33.2 |
| LP11 mode effective area (um²) | 41.2 | 41.1 |
| Ration of effective area of LP11 over LP01 | 1.39 | 1.24 |

The embodiments of optical fiber 10 can amplify optical signals of each mode provided by a few mode transmission fiber and are suitable for making a few mode optical amplifier for MDM systems.

According to some embodiments an optical amplifier comprises an Er doped few mode optical fiber 10, at least one pump light source optically coupled to the Er doped few mode optical fiber, and at least one optical coupler coupled to said optical fiber for providing signal light to Er doped few mode optical fiber. Thus, the optical coupler can couple light from a few moded transmission fiber to the amplifying fiber which in this embodiment is the Er doped few mode optical fiber. Another optical coupler can couple the amplified light (several amplified modes) to a few moded transmission fiber which in this embodiment is the Er doped few mode optical fiber. Thus, advantageously, after amplification, the multiple modes that need to be amplified can be amplified by a single optical amplifier. Also, advantageously, input single mode signals from amplifiers need not be converted back to the modes in an output few mode transmission fiber, as was done with amplifiers that utilize single mode (SM) amplifying fiber.

Figure 4:
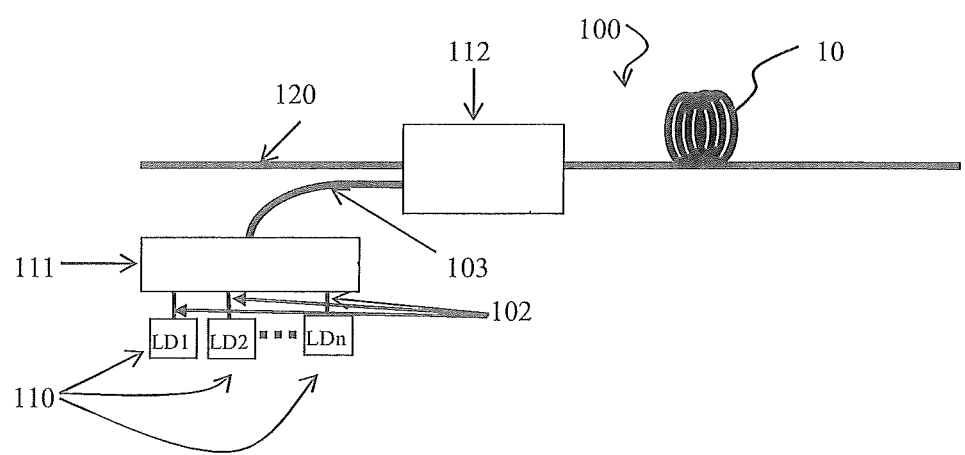
FIG. 4 is a schematic diagram of an example amplifier system that uses the few mode Er doped optical fiber.

FIG. 4 shows schematically a few mode optical amplifier 100. The optical amplifier 100 includes a plurality of pump light sources 110 (e.g., Laser Diode $LD_1$, $LD_2$, ... LFn), optical couplers 120 and an Er doped few mode fiber 10. The length of Er doped fiber 10 is between a few meters (1 to 2 m, for example) to a couple of hundred meters (300m, for example) depending on the gain coefficient of the optical fiber 10. Pump laser diodes $LD_1$ to LDn are optically coupled into the fiber 103 through the optical coupler 111, and then are coupled to the few mode Er doped optical fiber 10 through an optical coupler 112 to provide pump light in order to excite all the modes in a few mode fiber 10. The pump light and optical signals from a few mode transmission fiber 120 are combined and coupled to the Er-doped few mode fiber 10 though optical coupler 112. The Er doped few mode fiber 10 absorbs the pump light and transfers energy to the optical signals to amplify them. The optical gain of each mode can be adjusted by adjusting the pump power of each mode at the pump wavelength. An optional optical filter can be placed at the output of the optical fiber 10 in order to achieve flat gain spectrum in the wavelength band between 1530 to 1610 nm wavelengths.

In the embodiments shown and described herein, core 20 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

The cladding 50 may comprise pure silica glass ($SiO_2$), or silica glass with one or more dopants. The cladding may have one or more regions, for example an inner cladding and an outer cladding The cladding may include dopant(s) which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped", or silica glass with a dopant which decreases the index of refraction, such as fluorine, such as when a region of the cladding (e.g., the inner cladding) is "down-doped", so long as the maximum relative refractive index [$\Delta_{1MAX}$] of the core 20 is greater than the maximum relative refractive index [$\Delta_{4MAX}$] of the cladding 50. For example, in one embodiment, cladding 50 is pure silica glass.

The optical fiber may 10 may include a primary coating 62 contacting and surrounding the outer annular cladding region, and a secondary coating 64. The exemplary primary coating 62 has an in situ modulus of less than 0.35 MPa, preferably less than 0.3 MPa, more preferably less than 0.25 MPa, and in preferred embodiments not more than 0.2 MPa. The exemplary primary coating 62 has an in situ glass transition temperature less than −35° C., preferably less than −40° C., more preferably less than −45° C., and in preferred embodiments not more than −50° C. A primary coating with a low in situ modulus reduces the microbending which is the coupling mechanism between the modes propagating in the fiber. Since optical fiber 10 may to be packaged tightly bent, in order to provide a fiber amplifier with a smallest possible footprint, it is preferable to reduce the macrobending loss in the optical fiber 10. The secondary coating 64 contacts and surrounds the primary coating 62. The secondary coating 64 has an in situ modulus of greater than 1200 MPa, preferably greater than 1300 MPA, more preferably greater than 1400 MPa, and in preferred embodiments greater than 1500 MPa. A secondary coating with a high in situ modulus reduces the microbending which is the coupling mechanism between the modes propagating in the fiber.

The primary coating 62 preferably has a thickness that is less than about 40 µm, more preferably between about 20 to about 40 µm, most preferably between about 20 to about 30 µm. Primary coating 62 is typically applied to the glass fiber and subsequently cured, as will be described in more detail herein below. Various additives that enhance one or more properties of the primary coating can also be present, including antioxidants, adhesion promoters, PAG compounds, photosensitizers, carrier surfactants, tackifiers, catalysts, stabilizers, surface agents, and optical brighteners of the types described above.

A number of suitable primary coating compositions are disclosed, for example in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. Nos. 7,010,206 and 7,221,842 to Baker et al., and U.S. Pat. No. 7,423,105 to Winningham, each of which is incorporated herein by reference in its entirety.

Other suitable materials for use in outer (or secondary) coating materials, as well as considerations related to selection of these materials, are well known in the art and are described in U.S. Pat. Nos. 4,962,992 and 5,104,433 to Chapin, each of which is hereby incorporated by reference in its entirety The optical fibers of the present invention can be prepared using conventional draw tower technology for the preparation of the glass fiber and coatings thereof. Briefly, the process for making a coated optical fiber in accordance with the invention involves fabricating glass fiber with its core and cladding having the desired configuration, coating the glass fiber with the primary coating composition (62), the outer coating composition (64), and then curing all coatings simultaneously. This is known as a wet-on-wet process. Optionally, each subsequently applied coating composition can be applied to the coated fiber either before or after polymerizing the underlying coatings. The polymerization of underlying coatings prior to application of the subsequently applied coatings is known as a wet-on-dry process. When using a wet-on-dry process, additional polymerization steps must be employed.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary, intermediate, and secondary coating compositions are applied to the glass fiber after it has been drawn from the preform, preferably immediately after cooling. The coating compositions are then cured to produce the coated optical fiber. The method of curing is preferably carried out by exposing the un-cured coating composition on the glass fiber to ultraviolet light or electron beam. It is frequently advantageous to apply both the several coating compositions in sequence following the draw process. Methods of applying dual layers of coating compositions to a moving glass fiber are disclosed in U.S. Pat. No. 4,474,830 to Taylor and U.S. Pat. No. 4,851,165 to Rennell et al., each of which is hereby incorporated by reference in its entirety.

In this embodiment a fiber coating 60 is adjacent to and surrounds the cladding 50 and comprises at least two layers: a primary coating 62 contacting and surrounding the cladding 50 and a secondary coating 64. In one example embodiment, the primary coating 62 has an in situ modulus of less than about 0.35 MPa, an in situ glass transition temperature less than about −35° C., and the secondary coating 64 surrounds the primary coating 62 and has an in situ modulus of greater than 1200 MPa.

Preferably, in this embodiment, the core 20 has a radius $R_1$ from about 3 82 m to about 15 µm (e.g., 4 µm to 12 82 m)and has a maximum relative refractive index $\Delta_{1MAX}$ from about 0.2% to about 0.55% relative to the glass cladding 50 (or its outer cladding layer 54). For example, $\Delta_{1MAX}$ may be, for example 0.45% and $R_1$ may be about 10 µm. Also, for example, $\Delta_{1MAX}$ may be, 0.35% and $R_1$ may be about 11 µm, or $\Delta_{1MAX}$ may be 0.55% and $R_1$ may be about 9 µm. Preferably, the core 20 comprises a graded index with an alpha value greater than 1.8 and less than about 2.7 at a wavelength of 1550 nm and $\Delta_{3MIN}$<−0.1%. In some examples, the core 20 comprises a graded index with an alpha value greater than 2.3 and less than about 2.7 at a wavelength of 1550 nm and $\Delta_{2MIN}<-0.1\%$. Preferably, the spacing (thickness of the cladding region 52) between the low index ring 53 and the core 20, $R_2-R_1$, is greater than 2 mm, for example, $R_2-R_1>3$ μm, $R_2-R_1>4$ μm, or $R_2-R_1>5$ μm. Preferably, the low index ring 53 has a minimum relative refractive index delta $\Delta_{3MIN}<-0.2\%$; for example, $\Delta_{3MIN}<-0.25\%$, $\Delta_{3MIN}<-0.3\%$ or $-0.6\%<\Delta_{3MIN}<-0.2\%$. In these embodiments the low index ring 53 has a relative refractive index delta lower than that of pure silica glass (and is down-doped relative to pure silica). It is also noted that some embodiments of the optical fiber 10 utilize an inner cladding 52 and an outer cladding 54, but do not have a low index ring 53. In at least some embodiments the outer cladding 54 is pure (undoped) silica.

Preferably, the LP01 effective area Aeff is greater than about 20 μm² and less than about 250 μm² at 1550 nm, and the theoretical cutoff wavelength of the LP11 mode is greater than about 2000 nm. More preferably, the LP01 effective area Aeff is greater than about 20 μm² and less than about 200 μm² at 1550 nm. Most preferably, the LP01 effective area Aeff is greater than about 25 μm² and less than about 150 μm² at 1550 nm. Preferably, the relative delay between the LP01 and LP11 modes is less than about 0.5 ns/km at a wavelength of 1550 nm. In some exemplary embodiments the relative delay of the LP11 (relative to LP01 mode) mode is less than 0.25 ns/km, and in some examples less than 0.1 ns/km. In these exemplary embodiments, the attenuation of the LP01 mode is less than 0.2 dB/km.

According to some embodiments, the MPI is less than −20 dB at a wavelength of 1550 nm. according to other embodiments, the MPI is less than −25 dB at a wavelength of 1550 nm; according to other embodiments, the MPI is less than −30 dB at a wavelength of 1550 nm; and according to other embodiments, the MPI is less than −35 dB at a wavelength of 1550 nm. In some embodiments the MPI is less than −20 dB at a wavelength of 1550 nm and a theoretical cutoff of the LP11 mode is greater than 2.4 μm. According to other embodiments, the MPI is less than −25 dB at a wavelength of 1550 nm and a theoretical cutoff of the LP11 mode is greater than 2.25 μm. According to other embodiments, the MPI is less than −30 dB at a wavelength of 1550 nm and a theoretical cutoff of the LP11 mode is greater than 2.15 μm. According to other embodiments, the MPI is less than −35 dB at a wavelength of 1550 nm and a theoretical cutoff of the LP11 mode is greater than 2.0 μm.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
   (i) a glass core doped with greater than 300 ppm of $Er_2O_3$ and at least 0.5 wt % of $Al_2O_3$, with a radius $R_1$ from about 3μm to about 15μm, a maximum relative refractive index delta $\Delta_{1MAX}$ from about between 0.3% to 2% relatively to the glass cladding; an effective area of LP01 mode between 10 μm² and 100 μm² at 1550 nm, the glass core radius $R_1$ and refractive index are selected such that the core is capable of supporting the propagation and transmission of an optical signal with X number of LP modes at a wavelength of 1550 nm, wherein X is an integer greater than 1 and less than 20; and
   (ii) a glass cladding surrounding and in direct contact with the glass core, wherein the glass core comprises a maximum relative refractive index $\Delta_{1MAX}$ such that $\Delta_{1MAX}>\Delta_{4MAX}$.

2. An optical fiber comprising:
   (i) a glass core doped with greater than 700 ppm of $Er_2O_3$, at least 0.5 wt % of $Al_2O_3$ and 0 to 25 wt % of $GeO_2$, with a radius 3 μm ≤$R_1$≤15 μm; a maximum relative refractive index delta $\Delta_{1MAX}$ from between 0.7 to 1.5% relatively to the glass cladding, an effective area of LP01 mode between 50 μm² and 150 μm² at 1550 nm, the glass core supporting the propagation and transmission of an optical signal with X number of LP modes at a wavelength of 1550 nm, wherein X is an integer greater than 1 and less than 20 at 1550 nm wavelength; and
   (ii) a glass cladding surrounding and in direct contact with the glass core, wherein the glass core comprises a maximum relative refractive index $\Delta_{1MAX}$ such that $\Delta_{1MAX}>\Delta_{4MAX}$.

3. The optical fiber of claim 2, wherein the core is surrounded with an inner cladding and an outer cladding, and the inner cladding has a larger relative refractive index delta than pure silica.

4. The optical fiber of claim 2, wherein the core is surrounded with an inner cladding and an outer cladding, and the inner cladding has a larger refractive index than the outer cladding.

5. The optical fiber of claim 4, wherein the concentration of $Al_2O_3$ in the core is between 6 and 10%.

6. The optical fiber of claim 2 wherein refractive index profile of said core is constructed to provide a theoretical cutoff wavelength of an LP11 mode greater than about 2.0 μm and an LP01 effective area greater than 110 μm² at 1550 nm.

7. The optical fiber of claim 2 wherein the refractive index profile of said core is constructed to provide a theoretical cutoff wavelength of an LP11 mode greater than about 2.5 μm.

8. The optical fiber of claim 2 wherein said fiber comprises a core with a graded refractive index profile with an alpha value greater than or equal to about 1.8 and less than about 2.2 at a wavelength of 1550 nm.

9. The optical fiber according to claim 2, wherein said fiber comprises a step refractive index profile.

10. The optical fiber of claim 9, wherein the concentration of $Al_2O_3$ in the core is greater than 2 wt %.

11. The optical fiber of claim 10, wherein the concentration of $Al_2O_3$ in the core is between 6 and 10 wt %.

12. The optical fiber of claim 1 wherein refractive index profile of said core is constructed to provide a theoretical cutoff wavelength of an LP 11 mode greater than about 2.0 μm and an LP01 effective area greater than 110 $μm_2$ at 1550 nm.

13. The optical fiber of claim 1 wherein the refractive index profile of said core is constructed to provide a theoretical cutoff wavelength of an LP11 mode greater than about 2.5 μm.

14. The optical fiber of claim 1 wherein said fiber comprises a core with a graded refractive index profile with an alpha value greater than or equal to about 1.8 and less than about 2.2 at a wavelength of 1550 nm.

15. The optical fiber of claim 1, wherein said fiber cladding includes a low index ring, and an outer cladding surrounding the ring, such that the minimum refractive index delta of the low index ring is less than −0.2%, relative to the outer cladding.

16. The optical fiber of claim 1, wherein the minimum refractive index delta is between −0.6 and −0.2%.

17. The optical fiber of claim 2, wherein said fiber cladding includes a low index ring, and an outer cladding surrounding the ring, such that the minimum refractive index delta of the low index ring is less than −0.2%, relative to the outer cladding.

18. The optical fiber of claim 2, wherein the minimum refractive index delta is between −0.6 and −0.2%.

19. The optical fiber of claim 2, wherein said fiber further comprises a primary coating and a secondary coating, and the primary coating has an in situ modulus of less than about 0.35 MPa, and the secondary coating surrounds the primary coating 62 and has an in situ modulus of greater than 1200 MPa.

20. An optical amplifier comprising:
   an optical fiber of claim 1,
   at least one pump light source optically coupled to said optical fiber,
   and at least one optical coupler coupled to said optical fiber for providing signal light to said optical fiber.

* * * * *